United States Patent
Chang

(10) Patent No.: US 8,605,043 B2
(45) Date of Patent: Dec. 10, 2013

(54) TOUCH DISPLAY SYSTEM AND CONTROL METHOD THEREOF

(75) Inventor: Po-Chun Chang, Miao-Li County (TW)

(73) Assignee: Young Lighting Technology Inc., Hsin-Chu (TW)

( * ) Notice: Subject to any disclaimer, the term of this patent is extended or adjusted under 35 U.S.C. 154(b) by 835 days.

(21) Appl. No.: 12/659,420

(22) Filed: Mar. 9, 2010

(65) Prior Publication Data

US 2010/0241887 A1 Sep. 23, 2010

(30) Foreign Application Priority Data

Mar. 23, 2009 (TW) .............................. 98109311 A

(51) Int. Cl.
- *G06F 3/01* (2006.01)
- *G06F 1/32* (2006.01)
- *G06F 3/048* (2013.01)

(52) U.S. Cl.
USPC ........... 345/173; 713/300; 713/323; 715/702; 715/846

(58) Field of Classification Search
USPC ............ 345/173; 713/300, 323; 715/702, 846
See application file for complete search history.

(56) References Cited

U.S. PATENT DOCUMENTS 6,249,606 B1 * 6/2001 Kiraly et al. .................. 382/195
6,272,627 B1 * 8/2001 Mann ................. 713/2
2006/0238517 A1 * 10/2006 King et al. .................... 345/173
2009/0278805 A1 * 11/2009 Kao et al. ...................... 345/173
2010/0103133 A1 * 4/2010 Park et al. .................... 345/173

FOREIGN PATENT DOCUMENTS

| TW | 2005 21815 A | 7/2005 |
| TW | 2008 16035 A | 4/2008 |
| TW | 2008 36093 A | 9/2008 |
| TW | 2008 42685 A | 11/2008 |
| TW | 2009 03314 A | 1/2009 |
| TW | 2009 13635 A | 3/2009 |

OTHER PUBLICATIONS

Office Action dated Dec. 17, 2012 issued in corresponding Taiwanese application No. 098 109 311.

* cited by examiner

*Primary Examiner* — Amare Mengistu
*Assistant Examiner* — Jennifer Zubajlo
(74) *Attorney, Agent, or Firm* — Bacon & Thomas, PLLC

(57) ABSTRACT

A control method is applied to a touch display system. The touch display system includes a display module, a touch module, and a programmable circuit. The programmable circuit is electrically connected between the touch module and the display module for executing the control method. The method includes: the touch module providing a first sense area; detecting whether the first sense area being touched or not; the display module displaying an boot image when the first sense area being touched; providing a second sense area after the boot image being displayed; detecting whether the second sense area being touched or not; and the display module displaying an on-screen display menu when the second sense area being touched, wherein the on-screen display menu includes a power item and a plurality of function items.

12 Claims, 5 Drawing Sheets

TOUCH DISPLAY SYSTEM AND CONTROL METHOD THEREOF

BACKGROUND OF THE INVENTION (1) Field of the Invention

The present invention relates to a touch display system and control method thereof, and more particularly relates to a touch display system and control method thereof.

(2) Description of the Related Art

Refer to FIG. 1 for a functional diagram of a conventional touch display system 10. The touch display system 10 includes a touch module 11 and a display module 12, both connected to a host computer 20. The host computer 20 includes a communication port 21 and a display card 22. The communication port 21 is such as Universal Serial Bus (USB) or RS 232 serial port. The display card 22 is such as Video Graphics Array (VGA), Digital Visual Interface (DVI) or Display Data Channel Command Interface (DDC/CI).

The host computer 20 sends a start signal along a path S1 from the communication port 21 to the touch module 11 to start the touch module 11. After receiving a touch signal, the touch module 11 sends the touch signal back to the communication port 21 of the host computer 20 along the path S1. At this time, the host computer 20 detects content of the touch signal so as to order the display card 22 to send a display signal to the display module 12 of the touch display system 10 along a path S2. Then the display module 12 converts the display signal into an image and displays the image on the screen.

Moreover, in the conventional touch display system 10, the touch module 11 is unable to control the display module 12 directly.

The switch of the display module 12 is controlled by a power key disposed on the housing of the touch display system 10. Function keys are disposed additionally to adjust values of the control parameters of the display module 12, such as brightness, contrast, color, position, size of image, and so on. The power key and function keys increase size and fabrication cost of the touch display system 10.

SUMMARY OF THE INVENTION

The present invention provide a touch display system without keys to reduce size and cost of the touch display system.

To achieve one of, a part of or all of the above-mentioned advantages, an embodiment of the present invention provides a control method adapted to a touch display system. The touch display system includes a display module, a touch module and a programmable circuit. The programmable circuit is electrically connected between the touch module and the display module for executing the control method. The display module has a control unit such as a main chip and a display panel. The touch module is electrically connected to the display module for providing a first sense area and a second sense area separately at different time. The programmable circuit is electrically connected between the touch module and the display module. The touch module controls the control unit of the display module by the programmable circuit to make the display module display a boot image when the first sense area is touched, and the touch module controls the control unit of the display module by the programmable circuit to make the display module display an on-screen display menu when the second sense area is touched.

In an embodiment, the display module is used to provide power source to the touch module. The touch module has a first sense area. The programmable circuit has a timing mechanism for calculating the duration of the first sense area and the second sense area being touched. The on-screen display menu includes a power item and a plurality of function items, wherein the function items is selected from the group consisting of brightness, contrast, color, position, size, input signal format, and reset functions.

In an embodiment, the touch module is electrically connected to a host computer for bidirectional data transmission between the touch module and the host computer, and the host computer is used to provide power source to the touch module.

The host computer includes an operating system. A driver is used to embed a sense icon in the operating system. When the sense icon is touched, the touch module controls the display module by the programmable circuit to make the display module display an on-screen display menu.

Above control method comprises steps of: detecting whether the first sense area being touched or not; displaying a boot image by the display module when the first sense area being touched; generating a second sense area after the boot image being displayed; detecting whether the second sense area being touched or not; and displaying an on-screen display menu by the display module when the second sense area being touched, wherein the on-screen display menu includes a power item and a plurality of function items.

When the power item is touched, the power source of the display module is cut off. Besides, when the function items is touched, an image adjustment action of the display module is started, such as adjustment for brightness of image. At this time, the on-screen display menu covers the image for users to adjusting the size of covering area. In the adjustment action of image, the data transmission between the touch module and the host computer is stopped to avoid accidental touch.

In an embodiment, the step of detecting whether first sense area being touched is determined by detecting whether the first sense area being touched for a first preset time, and the step of detecting whether second sense area being touched is determined by detecting whether the second sense area being touched for a second preset time.

A sleep mode is started when displaying the boot image by the display module and if the display module does not receive image data from the host computer. The first sense area is detected under the sleep mode. If the first sense area is touched, the display module is closed.

Compared with the related art, the programmable circuit is electrically connected between the touch module and the display module to make the touch module provide users adjusting the on-screen display parameters of the display module directly without connecting to the host computer. Besides, no keys are used for adjusting the on-screen display function parameters and power switch, which decreases cost of the keys as well as the width of the frame of the display module, and increases the size of the image displayed on the display module.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
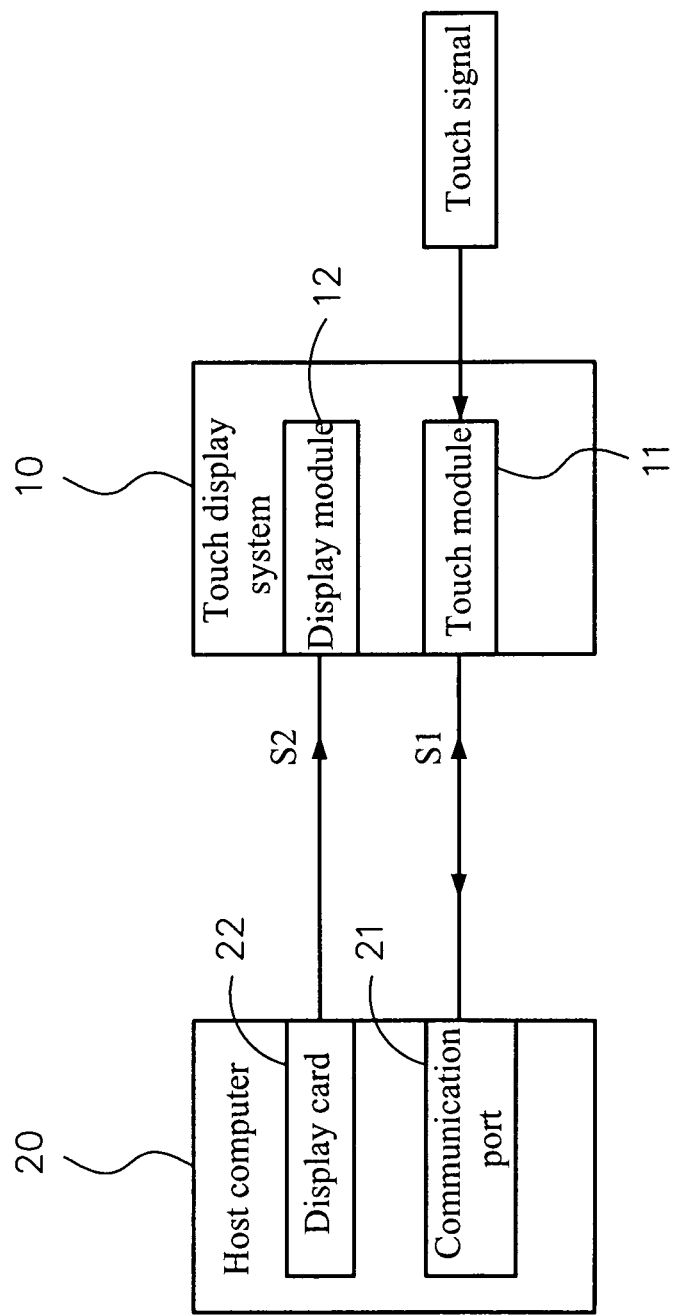
FIG. 1 is a functional diagram of a conventional touch display system.
Figure 2:
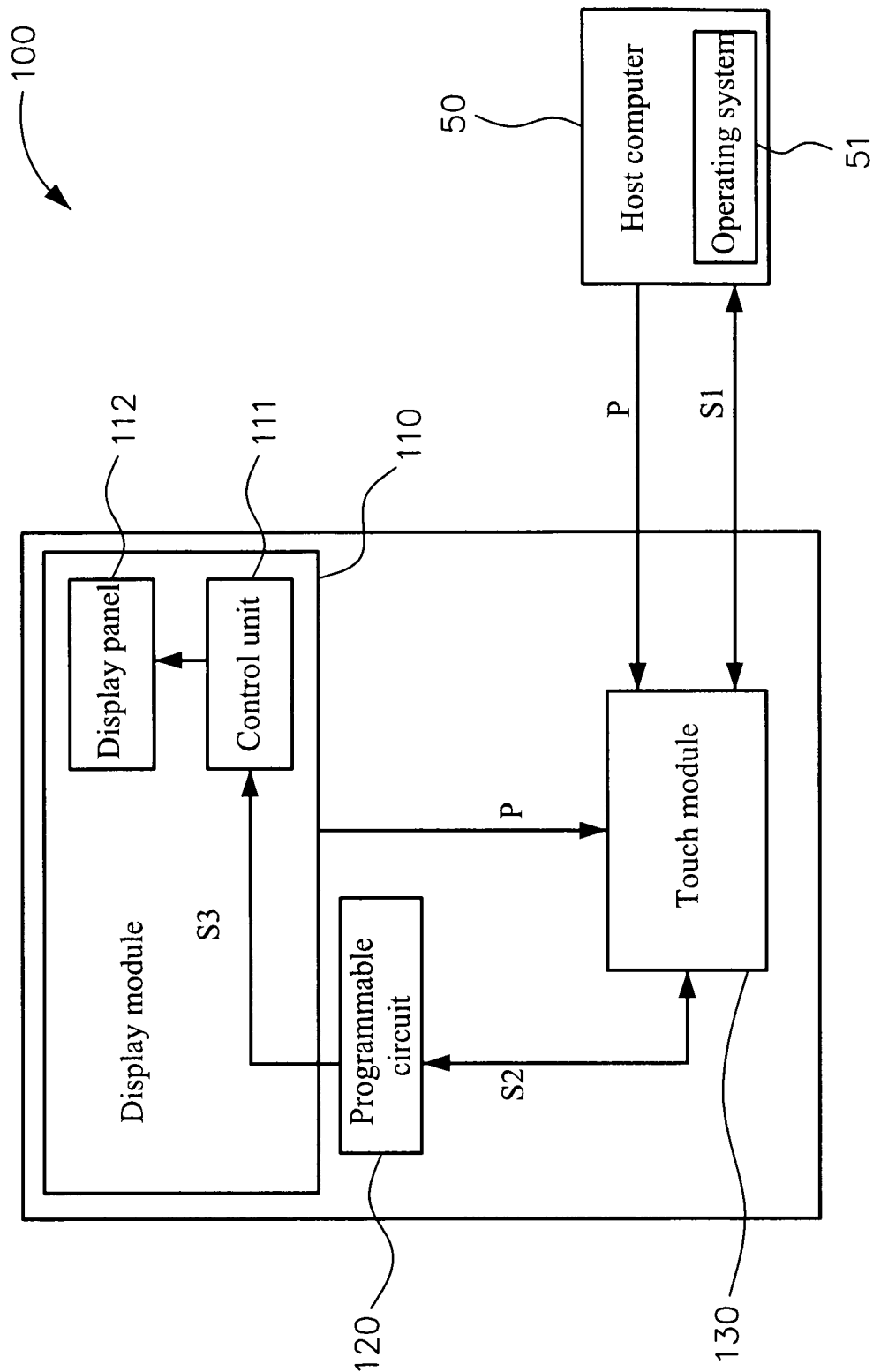
FIG. 2 is a functional diagram of a touch display system according to an embodiment of the present invention.

FIG. 2 is a functional diagram of the touch display system 100 according to an embodiment of the present invention. The touch display system 100 includes a display module 110, a programmable circuit 120 and a touch module 130.

The display module 110 includes a control unit 111 such as a main chip and a display panel 112. The control unit 111 is used to receive signal, process image data and control power. The programmable circuit 120 is electrically connected between the control unit 111 of the display module 110 and the touch module 130. The touch module 130 is electrically connected to the programmable circuit 120 and connected to the control unit 111 and the display panel 112 through the programmable circuit 120. The touch module 130 sends a touch signal (not shown) to the programmable circuit 120 along a path S2, and then the programmable circuit 120 sends the touch signal to the control unit 111 along a path S3 to display image on the display panel 112 with the control unit 111 controlling the display module 110. In the present embodiment, the display module 110 may match different kinds of touch modules 130 through the programmable circuit 120 without changing circuit structure of the display module 110, which saves research and design cost.

Besides, touch module 130 is electrically connected to the host computer 50. Touch information such as touch position may be transmitted between the host computer 50 and the touch module 130 along a path S1. The host computer 50 and the display module 110 may provide power P to the touch module 130 separately or in together to ensure the normal operation of the touch module 130.

Figure 3:
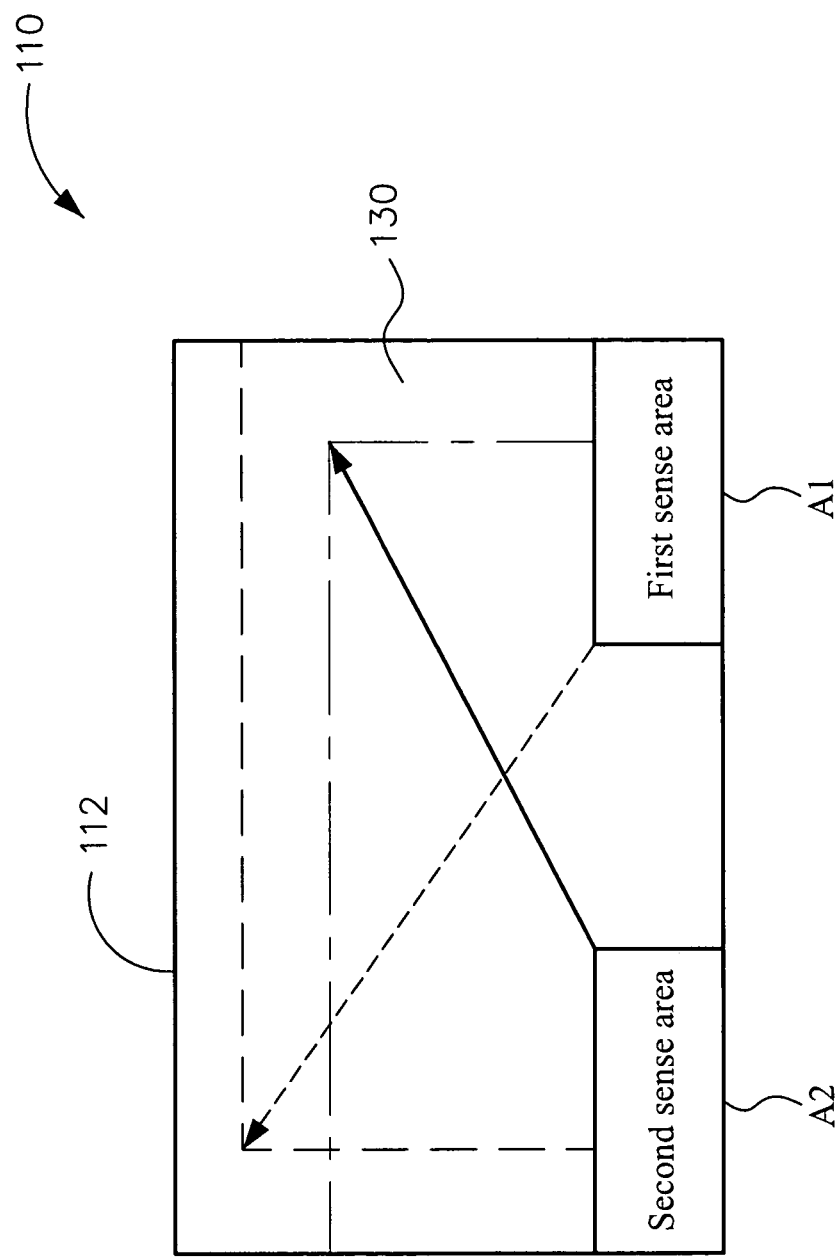
FIG. 3 is a front view of a display module of the touch display system according to an embodiment of the present invention.

Referring to FIG. 2 and FIG. 3, FIG. 3 is a front view of the display panel 112 of the display module 110. The touch module 130 is disposed on surface of the display panel 112 to provide a first sense area A1 and a second sense area A2 at different time so that users may touch the first or second sense area to generate a touch signal. In FIG. 3, surfaces of the first sense area A1 and the second sense area A2 and the display module 110 are overlapped. The present invention does not limit size and position of the first sense area A1 and the second sense area A2 on the display module 110. Two dotted lines in the figure are taken as examples. Size of the first sense area A1 on the display module 110 may be changed along direction of the dotted line arrow and size of the second sense area A2 on the display module 110 may be changed along direction of the real line arrow. In addition, positions of the first sense area A1 and the second sense area A2 on the display module 110 may be marked for users to use conveniently.

The programmable circuit 120 is provided for detecting whether the first sense area A1 and the second sense area A2 are touched or not. If the programmable circuit 120 detects the first sense area A1 is touched, the touch module 130 sends a touch signal to the programmable circuit 120 along the path S2, and then the programmable circuit 120 sends the touch signal to the control unit 111 along the path S3. The control unit 111 controls the display module 110 by the touch signal to make the display module 110 display a boot image. If the programmable circuit 120 detects the second sense area A2 is touched, the touch module 130 controls the control unit 111 of the display module 110 by the programmable circuit 120 to make the display module 110 display an on-screen display menu, the on-screen display menu includes a power item and a plurality of function items. The function items include a plurality of on-screen display function parameters such as brightness, contrast, color, position, size of image, input signal format, reset, etc.

Moreover, if the display module 110 does not receive an image data from the host computer 50 after displaying a boot image, the control unit 111 switches the display module 110 into a sleep mode.

If the programmable circuit 120 detects the power item of the on-screen display menu is touched, the touch module 130 sends a close signal along the paths S2 and S3, through the programmable circuit 120, and indicates the control unit 111 to cut off the power source of the display panel 112 to close the image. In addition, if the programmable circuit 120 detects the function item of the on-screen display menu is touched, the touch module 130 sends an adjusting signal along the paths S2 and S3, through the programmable circuit 120, and indicates the control unit 111 to start an image adjustment action of the display module 110. At this time, priority of touching on-screen display menu is set highest to avoid the touch module 130 generating two signals simultaneously to send the programmable circuit 120 and the host computer 50 separately and taking wrong actions. Thus the data transmission between the touch module 130 and the host computer 50 is stopped until exiting the on-screen display menu.

In an embodiment, the programmable circuit 120 has a timing mechanism for calculating the duration of the first sense area A1 or the second sense area A2 being touched. For avoiding accidental touch, the programmable circuit 120 detects whether the duration of the first sense area A1 being touched reaches the first preset time or not. If yes, the first sense area A1 is determined being touched, and then the display module 110 displays a boot image. Otherwise, it is an accidental action, and the display module 110 stays off. Similarly, the programmable circuit 120 detects whether the duration of the second sense area A2 being touched reaches the second preset time or not. If yes, the second sense area is determined being touched, and then the display module 110 displays the on-screen display menu, otherwise no on-screen display menu.

Figure 4:
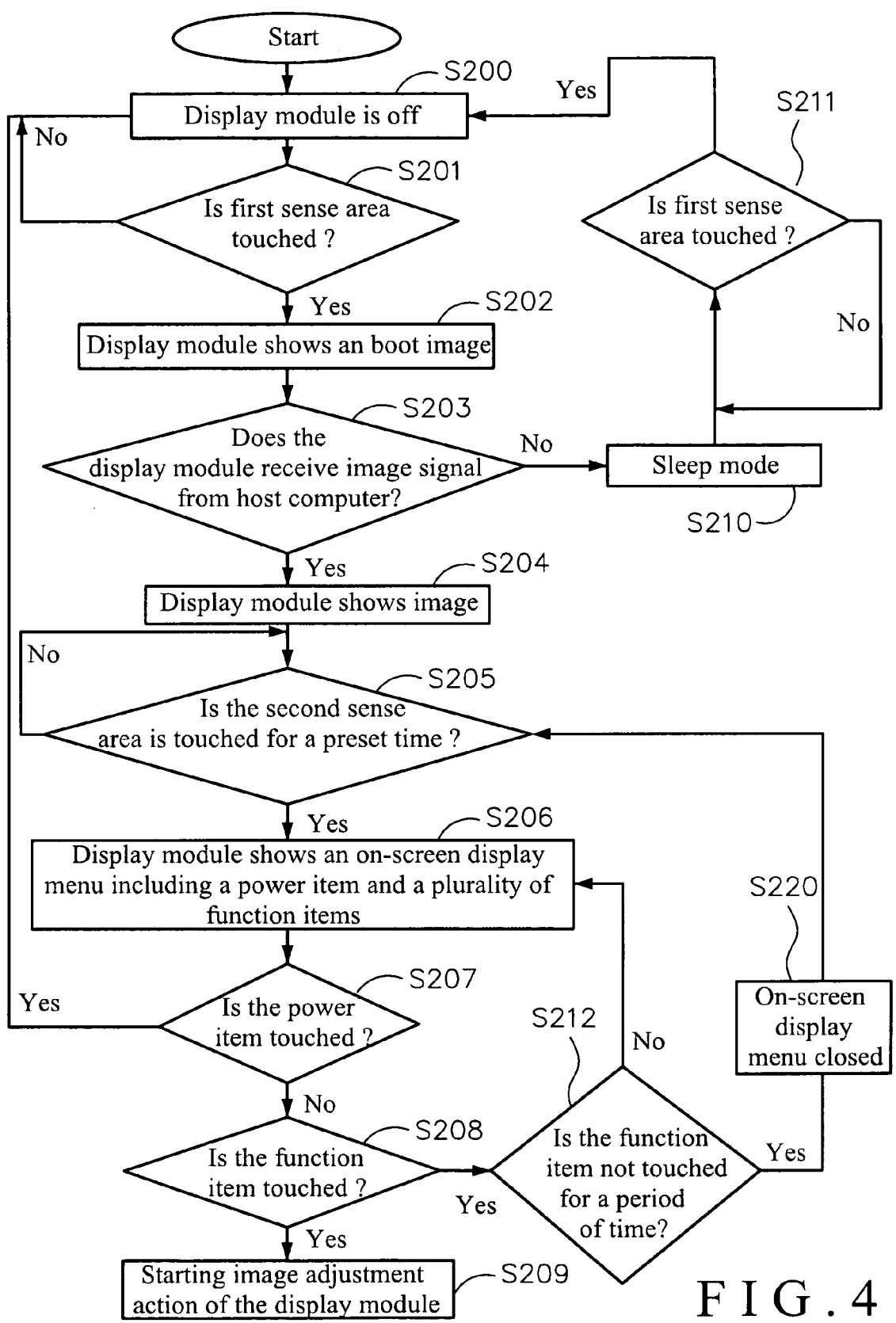
FIG. 4 is a flow chart of a control method of the touch display system according to an embodiment of the present invention.

Referring to FIG. 4, a control method of the touch display system includes following steps. The display module 110 is off at start (S200); then the touch module 130 defines the size and position of the first sense area A1, and the programmable circuit 120 determines whether the sense area A1 is touched or not (S201); the display module 110 displays a boot image if the first sense area A1 is touched (S202), otherwise the display module 110 stays off. In an embodiment, the programmable circuit 120 determines whether the first sense area A1 is touched or not by detecting whether the first sense area A1 is touched for a preset time.

Then, the display module 110 is detected whether it receives the image data from the host computer 50 or not (S203); the display panel 112 does not display the image if no image data is transmitted to the display module 110, thus the control unit 111 of the display module 110 starts a sleep mode (S210); after that, the programmable circuit 120 determines again whether the first sense area A1 is touched or not (S211). If not, return to the sleep mode, otherwise to the off state (S200).

If the display module 110 receives the image data from the host computer 50, then the control unit 111 of the display module 110 controls the display panel 112 to display an image (S204).

After the display panel 112 displays the image, the touch module 130 defines the size and position of the second sense area A2, and the programmable circuit 120 determines whether the second area A2 is touched or not (S205). If yes, the touch module 130 sends a touch signal to the programmable circuit 120 to control the control unit 111 of the display module 110, so that the display panel 112 displays the on-screen display menu (S206), the on-screen display menu includes a power item and a plurality of function items. If not, repeat the step S205. In an embodiment, the programmable circuit 120 detects the second sense area A2 being touched for a preset time to determine the second sense area A2 is touched or not.

Then, the programmable circuit 120 determines whether the power item is touched or not (S207). If yes, cut off the power source of the display panel 112 to the off state (S200).

Otherwise, when the programmable circuit 120 confirms the power item is not touched, the programmable circuit 120 subsequently determines whether the function item is touched or not (S208); if not, the programmable circuit 120 further determines if the function item is untouched for a period of time (S212). If the function item is touched during this period, return to the on-screen display menu (S206); if not, close the on-screen display menu (S220) and return to the step S205.

If the programmable circuit 120 confirms the function item is touched, start the image adjusting action of the display module 110 (S209).

Figure 5:
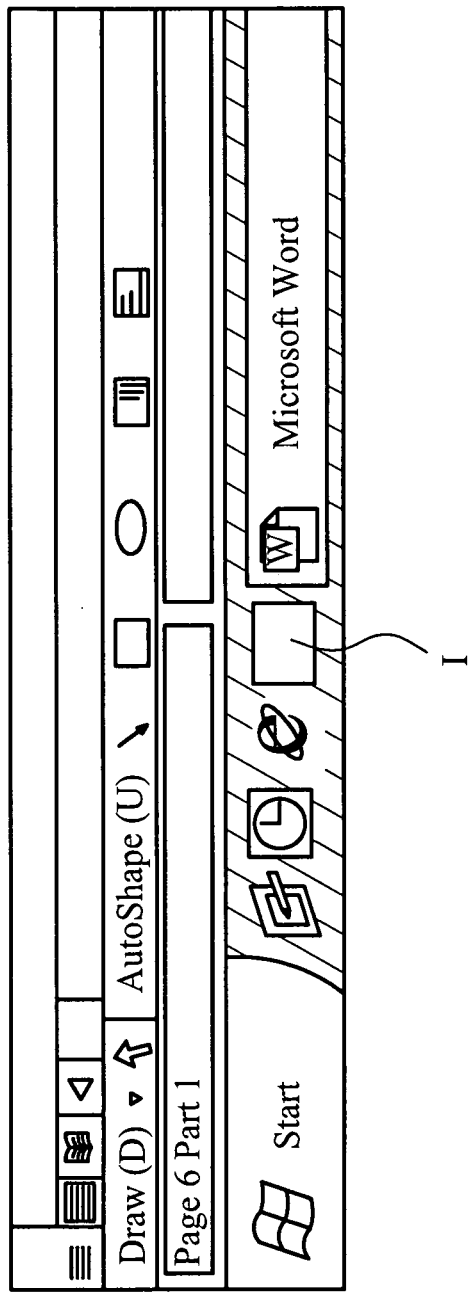
FIG. 5 is a schematic view of an operating system of the touch display system according to an embodiment of the present invention.

Referring to FIG. 2 and FIG. 3, in another embodiment of the touch display system 100, the first sense area A1 is provided by the touch module 130, and the second sense area A2 is a sense icon I. Refer to FIG. 5 for a schematic view of the operating system 51 including the sense icon I. The sense icon I is embedded in the operating system 51 of the host computer 50 by a driver, such as windows system.

When the first sense area A1 is touched, the touch module 130 controls the control unit 111 of the display module 110 by the programmable circuit 120 to make the display module 110 display a boot image. When the sense icon I is touched, the touch module 130 controls the control unit 111 of the display module 110 by the programmable circuit 120 to make the display module 110 display the on-screen display menu. The sense icon I has a higher priority, so that it may keep displaying on the screen and is not covered by icons of other programs.

In conclusion, the above embodiment or the embodiments may have at least one of the following advantages:

1. By the programmable circuit 120, the touch module 130 is able to provide users adjusting the on-screen display function parameters of the display module 110 directly without connecting to the host computer.

2. No keys are used for adjusting the on-screen display function parameters and power switch, which decreases size of the touch display system as well cost of the keys.

3. The display module 110 may cooperate with different touch display modules 130 through the programmable circuit 120 without changing circuit structure of the display module 110, which saves research and design cost.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A control method, adapted to a touch display system, the touch display system comprising a touch module, a programmable circuit, and a display module, the touch module having a first sense area, the programmable circuit electrically connected between the touch module and the display module for executing the control method and the touch module being electrically connected to a host computer for transmitting data with the host computer, the control method comprising steps of:

detecting whether the first sense area is touched or not;

displaying a boot image by the display module when the first sense area is touched;

generating a second sense area after the boot image is displayed;

detecting whether the second sense area is touched or not; and displaying an on-screen display menu by the display module when the second sense area is touched, wherein the on-screen display menu comprises a power item and a plurality of function items;

when one of the function items is touched, setting a priority of touching the on-screen display menu to a highest priority setting and stopping data transmission between the touch module and the host computer until exiting the on-screen display menu; and starting a sleep mode by the display module when displaying the boot image by the display module and if the display module does not receive image data from the host computer.

2. The control method of claim 1, wherein the second sense area is generated by the touch module.

3. The control method of claim 1, further comprising a step of cutting off power source of the display module when the power item being touched.

4. The control method of claim 1, further comprising a step of starting an image adjustment action of the display module when the function items being touched.

5. The control method of claim 1, wherein the step of detecting whether first sense area being touched is determined by detecting whether the first sense area being touched for a first preset time.

6. The control method of claim 1, wherein the step of detecting whether second sense area being touched is determined by detecting whether the second sense area being touched for a second preset time.

7. The control method of claim 1, wherein the host computer comprises an operating system, the steps of providing the second sense area comprise:

providing an icon;

providing a driver; and embedding the icon in the operating system by the driver, and displaying the icon as the second sense area by the operating system.

8. The control method of claim 1, further comprising steps of:

detecting the first sense area after starting the sleep mode; and closing the display module if the first sense area is touched.

9. A touch display system, comprising:

a display module, comprising a control unit and a display panel;

a touch module, disposed on the display panel of the display module for providing a first sense area and a second sense area separately at different time; and a programmable circuit, electrically connected between the touch module and the display module, wherein the touch module controls the control unit of the display module by the programmable circuit to make the display module display a boot image when the first sense area is touched, and the touch module controls the control unit of the display module by the programmable circuit to make the display module display an on-screen display menu when the second sense area is touched;

wherein the touch module is electrically connected to a host computer for bidirectional data transmission between the touch module and the host computer, and the host computer is used to provide power source to the touch module; and wherein the programmable circuit is configured to detect when a function item of the on-screen display menu is touched, and when a touch of the function item is detected, set a priority of touching the on-screen menu to a highest priority setting and stopping data transmission between the touch module and the host computer until exiting the on-screen display menu.

10. The touch display system of claim 9, wherein the display module is used to provide power source to the touch module.

11. The touch display system of claim 9, wherein the programmable circuit has a timing mechanism for calculating the duration of the first sense area and the second sense area being touched.

12. The touch display system of claim 9, wherein the on-screen display menu comprises a power item and a plurality of function items, wherein the function items is selected from the group consisting of brightness, contrast, color, position, size, input signal format, and reset functions.

* * * * *